US005254287A

United States Patent [19]

Deleeuw et al.

[11] Patent Number: 5,254,287

[45] Date of Patent: Oct. 19, 1993

[54] ENCAPSULATED ENZYME IN DRY BLEACH COMPOSITION

[75] Inventors: David L. Deleeuw, San Ramon; Dale S. Steichen, Byron; James D. Mitchell, Alamo, all of Calif.

[73] Assignee: The Clorox Company, Oakland, Calif.

[21] Appl. No.: 821,522

[22] Filed: Jan. 13, 1992

Related U.S. Application Data

[60] Continuation of Ser. No. 402,207, Sep. 1, 1989, Pat. No. 5,167,854, which is a continuation-in-part of Ser. No. 384,954, Jul. 24, 1989, Pat. No. 5,093,021, which is a continuation-in-part of Ser. No. 45,316, May 4, 1989, Pat. No. 4,863,626, which is a continuation-in-part of Ser. No. 899,461, Aug. 22, 1986, Pat. No. 5,089,167, which is a continuation-in-part of Ser. No. 767,980, Aug. 21, 1985, abandoned, and a continuation-in-part of Ser. No. 792,344, Oct. 28, 1985, abandoned, which is a continuation-in-part of Ser. No. 767,980, Oct. 28, 1985, Ser. No. 384,954, Oct. 28, 1985, which is a division of Ser. No. 45,316, Oct. 28, 1985.

[51] Int. Cl.[5] .......... C01B 15/055

[52] U.S. Cl. .......... 252/186.27; 252/186.25; 252/186.26; 252/186.3; 252/186.33; 252/174.12; 252/174.13; 252/95; 252/DIG. 12

[58] Field of Search .......... 252/186.1, 186.2, 186.26, 252/91, 95, 174.12, 174.13, 186.42, 186.27, 186.3, 186.33

[56] References Cited

U.S. PATENT DOCUMENTS

| | | | |
|---|---|---|---|
| 3,393,153 | 7/1968 | Zimmerer et al. | 252/95 |
| 3,494,787 | 2/1970 | Lind et al. | 117/100 |
| 3,553,139 | 1/1971 | McCarty | 252/95 |
| 3,637,339 | 1/1972 | Gray | 8/111 |
| 3,676,352 | 7/1972 | Grimm et al. | 252/99 |
| 3,770,816 | 11/1973 | Nielsen | 260/502 R |

(List continued on next page.)

FOREIGN PATENT DOCUMENTS

| | | |
|---|---|---|
| 127910 | 12/1984 | European Pat. Off. . |
| 200163 | 11/1986 | European Pat. Off. . |
| 206417 | 12/1986 | European Pat. Off. . |
| 206418 | 12/1986 | European Pat. Off. . |
| 286773 | 10/1988 | European Pat. Off. . |
| 290223 | 11/1988 | European Pat. Off. . |
| 382464 | 8/1990 | European Pat. Off. . |
| 1944904 | 4/1971 | Fed. Rep. of Germany . |
| 3636904 | 5/1988 | Fed. Rep. of Germany . |
| 2066844 | 7/1972 | France . |
| 87/07292 | 12/1987 | PCT Int'l Appl. . |
| 1456591 | 11/1976 | United Kingdom . |
| 1456592 | 11/1976 | United Kingdom . |

OTHER PUBLICATIONS

The Condensed Chemical Dictionary, Gessner G. Hawley, 9th Ed. Van Nostrand Reinhold Co., p. 642.

*Oxidation of Organic Compounds*, ACS, 1968, vol. 1, Mayo, "Inhibition of Autoxidation".

Search Report from European Patent Application No. 90.309255 (equivalent to U.S. patent application Ser. No. 07/402,207, now U.S. Pat. 5,167,854, parent hereof).

S. N. Lewis, "Peracid and Peroxide Oxidations," in: Oxidation (Marcel Dekker, New York, 1969), vol. 1, Chapter 5, pp. 213–258.

*Primary Examiner*—Richard D. Lovering
*Assistant Examiner*—Joseph D. Anthony
*Attorney, Agent, or Firm*—Joel J. Hayashida; Michael J. Mazza; Harry A. Pacini

[57] ABSTRACT

The invention relates to a bleaching composition containing an oxidant bleach and enzyme granules, in which enzyme stability is prolonged without undue loss of solubility despite intimate contact of said enzyme granules with said oxidant bleach. In the invention, an oxidant is selected from the group consisting of alkali metal perborates, alkali metal percarbonates, hydrogen peroxide adducts, and mixtures thereof, and combined with an enzyme which is coated substantially completely by a water soluble polymer, in which an additive selected from the group consisting of reducing agents, a transition metal, and mixtures thereof is incorporated to enhance enzyme stability.

7 Claims, 3 Drawing Sheets

U.S. PATENT DOCUMENTS

| | | | |
|---|---|---|---|
| 3,840,466 | 10/1974 | Gray | 252/99 |
| 3,950,277 | 4/1976 | Stewart et al. | 252/541 |
| 3,975,280 | 8/1976 | Hachmann et al. | 252/102 |
| 3,983,002 | 9/1976 | Ohya et al. | 195/66 R |
| 4,011,169 | 3/1977 | Diehl et al. | 252/95 |
| 4,091,544 | 5/1978 | Hutchins | 34/8 |
| 4,094,808 | 6/1978 | Stewart et al. | 252/185 |
| 4,100,095 | 7/1978 | Hutchins | 252/88 |
| 4,115,292 | 8/1978 | Richardson et al. | 252/90 |
| 4,126,573 | 11/1978 | Johnston | 252/99 |
| 4,128,495 | 12/1978 | McCrudden | 252/186 |
| 4,155,868 | 5/1979 | Kaplan et al. | 252/95 |
| 4,170,453 | 10/1979 | Kitko | 8/111 |
| 4,259,201 | 3/1981 | Cockrell et al. | 252/103 |
| 4,337,213 | 6/1982 | Marynowski et al. | 260/502 R |
| 4,381,247 | 4/1983 | Nakagawa et al. | 252/95 |
| 4,421,664 | 12/1983 | Anderson et al. | 252/94 |
| 4,430,244 | 2/1984 | Broze et al. | 252/94 |
| 4,435,307 | 3/1984 | Barbesgaard et al. | 252/174.12 |
| 4,443,355 | 4/1984 | Murata et al. | 252/174.12 |
| 4,450,089 | 5/1984 | Broze et al. | 252/95 |
| 4,479,881 | 10/1984 | Tai | 252/8.8 |
| 4,501,681 | 2/1985 | Groult et al. | 252/174.12 |
| 4,511,490 | 9/1985 | Stanislowski et al. | 252/174.12 |
| 4,707,287 | 11/1987 | Herdeman | 252/91 |
| 4,863,626 | 8/1989 | Coyne et al. | 252/91 |
| 5,089,167 | 2/1992 | Coyne et al. | 252/186.26 |
| 5,093,021 | 3/1992 | Coyne et al. | 252/91 |

ENCAPSULATED ENZYME IN DRY BLEACH COMPOSITION

This is a continuation of application Ser. No. 07/402,207, filed Sep. 1, 1989, now U.S. Pat. No. 5,167,854, which itself is a continuation-in-part of U.S. pat. application Ser. No. 07/384,954, filed Jul. 24, 1989, now U.S. Pat. No. 5,093,021, and Ser. No. 07/045,316, filed May 4, 1989, now U.S. Pat. No. 4,863,626, (and itself a continuation-in-part of U.S. pat. application Ser. No. 06/899,461, filed Aug. 22, 1986, now U.S. Pat. No. 5,089,167, which is a continuation-in-part of applications Ser. No. 06/767,980, filed Aug. 21, 1985, now abandoned and Ser. No. 06/792,344, filed Oct. 28, 1985, now abandoned, itself a continuation-in-part of application Ser. No. 06/767,980). Ser. No. 07/384,954 is itself a division of Ser. No. 07/045,316. The disclosure of each enumerated application is expressly incorporated herein by reference thereto.

FIELD OF THE INVENTION

This invention relates to household fabric bleaching products, and more particularly to dry bleach products which are based upon oxidant bleaches, especially organic peroxyacid bleach compositions, and which contain enzymes. The enzymes are present in the bleach composition as discrete granules which are coated to enhance the stability of the enzymes. The enzyme coating contains one or more active agents which protect the enzyme from degradation by the bleach composition.

BACKGROUND OF THE INVENTION

Bleaching compositions have long been used in households for the bleaching and cleaning of fabrics. Liquid bleaches based upon hypochlorite chemical species have been used extensively, as they are inexpensive, highly effective, easy to produce, and stable. However, the advent of modern synthetic dyes and the use of modern automatic laundering machines have introduced new requirements in bleaching techniques, and have created a need for other types of bleaching compositions. In order to satisfy this need, and to broaden and extend the utility of bleaches in household use, other bleach systems have been introduced in recent years.

Of particular interest recently have been dry bleaching compositions based upon peroxyacid chemical species. Peracid chemical compositions have a high oxidation potential due to the presence of one or more of the chemical functional group:

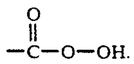

In addition to active oxidizing agents, it is also desirable to provide one or more enzymes for the purpose of stain removal. Enzymes have the ability to degrade and promote removal of certain soils and stains by the cleavage of high molecular weight soil residues into low molecular weight monomeric or oligomeric compositions readily soluble in cleaning media, or to convert the substrates into different products. Enzymes have the substantial benefit of substrate specificity: enzymes attack only specific bonds and usually do not chemically affect the material to be cleaned. Exemplary of such enzymes are those selected from the group of enzymes which can hydrolyze stains and which have been categorized by the International Union of Biochemistry as hydolases. Grouped within hydrolases are proteases, amylases, lipases, and cellulases.

Enzymes are somewhat sensitive proteins which have a tendency to denature (change their molecular structures) in harsh environments, a change which can render the enzymes ineffective. Strong oxidant bleaches such as organic peracids adversely affect enzyme stability, especially in warm, humid environments in which there is a concentration of oxidant bleaching species.

Various methods to stabilize enzymes and provide a good mixture of enzyme and detergent or bleach have been proposed. Enzymes have variously been attached to carriers of clay, starch, and aminated polysaccharides, and even conglutinated to detergent carriers. Enzymes have been granularized, extruded, encased in film, and provided with colorizing agents. Attempts have been made to enhance enzyme stability by complexing the enzymes with proteins, by decreasing the relative humidity of the storage environment, by separating the bleach into discrete granules, and by the addition of reducing agents and pH buffers. However, the instability of enzymes in peroxyacid bleach compositions has continued to pose a difficulty, especially in the long-term storage of peroxyacid bleach compositions in which enzymes and bleach are in intimate contact.

BRIEF DESCRIPTION OF THE INVENTION

The present invention relates to enzyme-containing oxidant bleach compositions, especially organic diperacid based bleaching products. More specifically, compositions provide enzyme stability during prolonged storage in the presence of oxidants, while supporting enzyme solubility.

The improved product is prepared by coating or encapsulating the enzyme or enzymes with a material which both effectively renders the enzyme resistance to degradation in bleach products and allows for sufficient solubility upon introduction into an aqueous medium, such as found during laundering. Particularly, alkaline materials act as protective agents, which neutralize oxidant species before they contact and denature the enzyme. Exemplary of such protective agents are sodium silicate and sodium carbonate, both of which act to physically block the attack of the enzyme by oxidants, and to chemically neutralize the oxidants. Active protective agents also include reducing materials, such as sodium sulfite and sodium thiosulfate, and antioxidants such as BHT (butylated hydroxytoluene) and BHA (butylated hydroxyanisole), which act to inhibit radical chain oxidation. Transition metals, especially iron, cobalt, nickel, and copper, act as catalysts to speed up the breakdown of oxidant species and thus protect the enzymes. These active enzyme protective agents may be used in conjunction with carriers, especially water-soluble polymers, which do not of themselves protect the enzyme, but which provide enhanced solubility and act as dispersant agents or carriers for protective agents.

Standard bleaching composition adjuncts such as builders, fillers, buffers, brighteners, fragrances, and the like may be included in an enzyme-containing oxidant bleach composition in addition to the discrete enzyme granules, and the oxidant bleach.

It is therefore an object of the invention to provide enzymes which are protected from denaturation in a composition containing oxidant bleaches.

It is another object of the invention to provide coated enzymes which are soluble in aqueous media.

It is another object of the invention to provide an oxidant bleach composition containing enzymes which exhibit increased stability upon storage.

It is yet another object of the invention to provide stabilized enzymes in an enzyme-containing peracid bleaching composition.

Other objects and advantages of the invention will become apparent from a review of the following description and the claims appended hereto.

DETAILED DESCRIPTION OF THE INVENTION

Unless indicated to the contrary, all percentages, ratios, or parts are determined by weight.

ENZYMES

Figure 1:
FIG. 1 is a scanning electron micrograph showing a cross-sectional view of uncoated Alcalase® 2.OT.

Enzymes are a known addition to conventional and perborat, especially, containing detergents and bleaches, where they act to improve the cleaning effect of the detergent by attacking soil and stains. Enzymes are commercially supplied in the form of prills, small round or acicular aggregates of enzyme. A cross-section of a prilled enzyme is shown in FIG. 1. When such prills were added to traditional dry detergents the enzyme tends to settle out from the remainder of the detergent blend. This difficulty found solution by granulation of the enzyme, i.e., by adhering the enzyme to a carrier, such as starch or clay, or by spraying the enzyme directly onto the solid detergent components. Such techniques were adequate for the relatively mild dry detergent compositions known in the past. However, these granulation techniques have not proven adequate to protect enzymes from degradation by newer, stronger oxidant bleach compositions.

Enzymes capable of hydrolyzing substrates, e.g., stains, are commonly utilized in mild bleach compositions. Accepted nomenclature for these enzymes, under the International Union of Biochemistry, is hydrolases. Hydrolases include, but are not limited to, proteases (which digest proteinaceous substrates), amylases (also known as carbohydrases, which digest carbohydrates), lipases (also known as esterases, which digest fats), cellulases (which digest cellulosic polysaccharides), and mixtures thereof.

Proteases, especially alkaline proteases, are preferred for use in this invention. Alkaline proteases are particularly useful in cleaning applications, as they hydrolyze protein substrates rendering them more soluble, e.g., problematic stains such as blood and grass.

Commercially available alkaline proteases are derived from various strains of the bacterium Bacillus subtilis. These proteases are also known as subtilisins. Nonlimiting examples thereof include the proteases available under the brand names Esperase®, Savinase®, and Alcalase®, from Novo Industry A/S, of Bagsvaerd, Denmark; those sold under the brand names Maxatase®, and Maxacal®, from Gist-Brocades N.V. of Delft, Netherlands; and those sold under the brand name Milezyme® APL, from Miles Laboratories, Elkhart, Ind. Mixtures of enzymes are also included in this invention. See also, U.S. Pat. No. 4,511,490, issued to Stanislowski et al., the disclosure of which is incorporated herein by reference.

Commercially available proteases are supplied as prilled, powdered or comminuted enzymes. These enzymes can include a stabilizer, such as triethanolamine, clays, or starch.

Other enzymes may be used in the compositions in addition to, or in place of, proteases. Lipases and amylases can find use in the compositions. Lipases are described in U.S. Pat. No. 3,950,277, column 3, lines 15-55, the description of which is incorporated herein by reference. Suitable amylases include Rapidase®, from Societe Rapidase, France; Maxamyl®, from Gist-Brocades N.V.; Termamyl®, from Novo Industry A/S; and Milezyme® DAL, from Miles Laboratories. Cellulases may also be desirable for incorporation and description of U.S. Pat. No. 4,479,881, issued to Tai, U.S. Pat. No. 4,443,355, issued to Murata et al., U.S. Pat. No. 4,435,307, issued to Barbesgaard et al. and U.S. Pat. No. 3,983,002, issued to Ohya et al., each of which is incorporated herein by reference.

The enzyme level preferred for use in this invention is, by weight of the uncoated enzyme, about 0.1% to 10%, more preferably 0.25% to 3%, and most preferably 0.4% to 2%.

OXIDANT BLEACHES

Enzymes are subject to degradation by heat, humidity, and chemical action. In particular, enzymes can be rapidly denatured upon contact with strong oxidizing agents. Generally, prior art techniques, e.g. granulation, may not be sufficient to protect enzymes in strong oxidant compositions, such as those based upon dry hypochlorite and peroxyacid bleaches. Additionally, compounds which generate hydrogen peroxide in aqueous media can have deleterious effects on enzyme in storage. These compounds include alkali metal perborates (sodium perborate mono- and tetrahydrates) percarbonates (sodium percarbonate) and various hydrogen peroxide adducts.

Oxidant bleaches generally deliver, in aqueous media, about 0.1 to 50 ppm A.O (active oxygen), more generally about 0.1 to 30 ppm A.O. An analysis for, and a description of, A.O. appears in "Peracid and Peroxide Oxidations", *Oxidation*, pp. 213-258 (1969), by Dr. S. N. Lewis, the text of which is incorporated herein by reference.

Organic diperacids are good oxidants and are known in the art to be useful bleaching agents. The organic diperacids of interest can be synthesized from a number of long chain diacids. U.S. Pat. No. 4,337,213, issued Jun. 29, 1982 to Marynowski, et al., the disclosure of which is incorporated herein by reference, describes the production of peracids by the reaction of a selected acid with $H_2O_2$ in the presence of $H_2SO_4$.

Organic diperacids have the general structure:

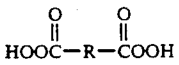

where R is a linear alkyl chain of from 4 to 20, more preferably 6 to 12 carbon atoms. Particularly preferred are diperoxydodecanedioic acid (DPDDA), in which R is $(CH_2)_{10}$, and diperazelaic acid (DPAA), in which R is $(CH_2)_7$.

Detergent bleaches which contain peroxyacids generally also contain exotherm control agents, to protect the peroxyacid bleach from exothermic degradation by controlling the amount of water which is present. Typical exotherm control agents are hydrated salts such as a $MgSO_4/Na_2SO_4$ mixture. It has been discovered that combining the peroxyacid and the exotherm control agents into granules, and carefully controlling the water content of such granules, increases the stability of enzymes present in the composition. See pending application U.S. Ser. No. 899,461, filed Aug. 22, 1986. Other oxidants useful herein are sodium perborate mono- and tetrahydrate, and sodium percarbonate.

OTHER ADJUNCT INGREDIENTS

Adjunct ingredients may be added to the bleach and enzyme composition disclosed herein, as determined by the use and storage of the product. Bleaching compositions are disclosed in pending application Ser. No. 899,461, filed Aug. 22, 1986.

Organic dicarboxylic acids of the general formula HOOC—R'—COOH, wherein R' is 1 to 10 carbon atoms (for instance, adipic acid $R'=(CH_2)_4$), are desirable adjuncts in the detergent bleach composition. Such organic acids serve to dilute the diperacid, if present, and aid in pH adjustment of the wash water when the bleach product is used.

When diperacid is present in a granular form with the exotherm control agent and, optionally, with organic acids, it is especially desirable to maintain the physical integrity of the granule by the use of binding agents. Such materials serve to make the bleach granules resistant to dusting and splitting during transportation and handling. Unneutralized polymeric acids are of particular interest, as their use greatly reduces or eliminates the unpleasant odor note associated with diperoxyacids in detergent bleach compositions.

Fluorescent whitening agents (FWAs) are desirable components for inclusion in bleaching formulations, as they counteract the yellowing of cotton and synthetic fibers. FWAs are absorbed on fabrics during the washing and/or bleaching process. FWAs function by absorbing ultraviolet light, which is then emitted as visible light, generally in the blue wavelength ranges. The resultant light emission yields a brightening and whitening effect, which counteracts yellowing or dulling of the bleached fabric. Such FWAs are available commercially from sources such as Ciba Geigy Corp. of Basel, Switzerland, under the trade name "Tinopal". Similar FWAs are disclosed in U.S. Pat. No. 3,393,153, issued to Zimmerer et al., which disclosure is incorporated herein by reference.

Protection of the FWAs may be afforded by mixing with an alkaline diluent, which protects the FWAs from oxidation; a binding agent; and, optionally, bulking agents e.g., $Na_2SO_4$, and colorants. The mixture is then compacted to form particles, which are admixed into the bleach product. The FWA particles may comprise from about 0.5% to 10% by weight of the bleach product.

A fragrance which imparts a pleasant odor to the bleaching composition is generally included. As fragrances are subject to oxidation by bleaches, they may be protected by encapsulation in polymeric materials such as polyvinyl alcohol, or by absorbing them into starch or sugar and forming them into beads. These fragrance beads are soluble in water, so that fragrance is released when the bleach composition is dissolved in water, but the fragrance is protected from oxidation by the bleach during storage.

Fragrances also are used to impart a pleasant odor to the headspace of the container housing bleach composition. See, for example, Mitchell et al., U.S. Pat. No. 4,858,758, the disclosure of which is incorporated herein.

Buffering, building, and/or bulking agents may also be present in the bleach product. Boric acid and/or sodium borate are preferred agents to buffer the pH of the composition. Other buffering agents include sodium carbonate, sodium bicarbonate, and other alkaline buffers. Builders include sodium and potassium silicate, sodium phosphate, sodium tripolyphosphate, sodium tetraphosphate, aluminosilicates (zeolites), and organic builders such as sodium sulfosuccinate. Bulking agents may also be included. The most preferred bulking agent is sodium sulfate. Buffer, builder, and bulking agents are included in the product in particulate form such that the entire composition forms a free-flowing dry product. Buffers may range from 5% to 90% by weight, while builder and/or bulking agents may range from about 5% to 90% by the weight of composition.

COATED ENZYMES

Coated enzymes are prepared by substantially completely coating or encapsulating the enzyme with a material which both effectively renders the enzyme resistant to the oxidation of bleach, and allows for sufficient solubility upon introduction of the granule into an aqueous medium.

Active agents which protect the enzyme when included in the coating fall into several categories: alkaline or neutral materials, reducing agents, antioxidants, and transition metals. Each of these may be used in conjunction with other active agents of the same or different categories. In an especially preferred embodiment, reducing agents, antioxidants and/or transition metals are included in a coating which consists predominantly of alkali metal silicates and/or alkali metal carbonates.

The most preferred coatings provide a physical barrier to attack by oxidants, and also provide a chemical barrier by actively neutralizing scavenging oxidants. Basic (alkaline) materials which have a pH exceeding about 11, more preferably, between 12 and 14, such as alkali metal silicates, especially sodium silicate, and combinations of such silicates with alkali metal carbonates or bicarbonates, especially sodium carbonate, provide such preferred coatings. Silicates, or mixtures of silicates with carbonates or bicarbonates, appear especially desirable since they form a uniform glassy matrix when an aqueous dispersion of the silicate, or mixtures of silicates with carbonates or bicarbonates, is applied to the enzyme core. This would obviate the need for a carrier material to effect coating. The addition of the alkali metal carbonates or bicarbonates can improve the solubility of the enzyme coating. The levels of such carbonate or bicarbonate in the silicate coating can be adjusted to provide the desired stability/solubility characteristics. The pH of a salt, or mixtures thereof, is measured as a 10% aqueous solution of the salt or salts.

Other preferred coatings include an alkaline material, as above, in conjunction with one or more active agents which chemically react to neutralize any oxidant with which it comes in contact. In addition to the alkaline materials discussed above, active agents include reducing materials, i.e., sodium sulfite and sodium thiosulfite; antioxidants, i.e. BHA and BHT; and transition metals, especially iron, cobalt, nickel, and copper. These agents may be used singly, in combination with other reactive agents, or may be used in conjunction with carriers, especially film-forming water-soluble polymers, which do not of themselves provide enhanced enzyme stability, but which provide enhanced solubility for the active agents. When the active agents are provided in an essentially inert carrier, they provide active protection for the enzyme.

Materials which may be used as an active agents herein provide effective barrires to scavenging oxidant species by various means. Basic additives, such as sodium carbonate and sodium silicate, neutralize acidic oxidants. Reducing agents, such as sodium sulfite and sodium thiosulfate, and antioxidants, such as BHA and BHT, reduce the effect of scavenging oxidant species by chemical reaction with oxidants. The transition metals (i.e., iron, cobalt, nickel, copper, and mixtures thereof) act to catalyze the decomposition of the oxidant and thus protect the enzyme. Reducing agents, antioxidants, and transition metals may be used in the enzyme coating either in conjunction with an alkali metal silicate or in conjunction with an appropriate carrier.

Suitable carriers for the active agents herein need not provide for stability of the enzyme without the presence of the active agents, but they must be sufficiently nonreactive in the presence of the protective agents to withstand decomposition by the oxidant bleaches. Appropriate carriers include water-soluble polymers, surfactants/dispersants, and basic materials. Examples of water-soluble polymers include polyacrylic acid (i.e., Alcosperse 157A), polyethylene glycol (i.e. Carbowax PEG 4600), polyvinyl alcohol, polyvinylpyrrolidone and Gantrez ES-225® (monoethyl ester of poly(-methyl vinyl ether/maleic acid)). Exemplary of the surfactants which find use as carriers are wetting agents such as Neodol® (Shell Chemical Co.) and Triton (Rohm and Haas), both of which are nonionic surfactants.

Active protective agents which are alkaline include the alkali metal silicates and carbonates, especially lithium, sodium, and potassium silicates and carbonates, most preferably sodium silicate and sodium carbonate. However, when the alkali metal silicates are used as protective active agents, care must be taken to provide sufficient solubility. The modulus of the silicate determines its solubility in aqueous media. Sodium silicate having a modulus (i.e., ratio of $SiO_2$:$Na_2O$) of 3.22:1, such as PQ brand "N" sodium silicate provides adequate enzyme stability, but low solubility under U.S. washing conditions. Sodium silicate having a modulus of 2:1, such as PQ brand "D" sodium silicate provides both acceptable stability and sufficient solubility. Preferred for use in the invention is sodium silicate having a modulus of about 1:1 to 3:1; more preferably about 1:1 to 2.75:1; most preferably, 1.5:1 to 2.5:1, if no other additive to the coating is present. However, sodium silicates with a modulus of greater than 3:1 may be utilized, particularly when combined with an additive such as a reducing agent, for example, sodium sulfite. It is believed that the additive modifies the crystalline structure of the silicate, rendering the coating more soluble.

The alkali metal silicates or carbonates may be used in conjunction with a water-soluble carrier to ensure sufficient solubility. Mixtures of the alkali metal silicates and/or the alkali metal carbonates may be used.

In the most preferred embodiment, sodium silicate may be present in the coating in an amount of 5 to 100% by weight, preferably from 40 to 100%, more preferably 60 to 100% by weight.

Lithium or potassium silicates may be present in the coating in an amount of 5 to 100% by weight, preferably 40 to 100%, more preferably 60 to 100% by weight. Similarly, sodium carbonate may be present in the coating in an amount of 0 to 99% by weight, preferably from 2 to 50%, more preferably 4 to 25% by weight. Lithium or potassium carbonates may be present in the coating in an amount of 0 to 99% by weight, preferably 2 to 50%, more preferably 4 to 25% by weight.

Other protective active agents provide varying solubilities and varying stabilizing effects. It appears that transition metals may cause decomposition of the peracid in the wash solution if present in more than small amounts. It is therefore generally preferred that transition metals be present in the coating in an amount of 1 to 2,000 parts per million, preferably 2 to 1,000, more preferably 50 to 500 parts per million. Reducing agents do not catalytically decompose the peracid, so that they may be present in the coating in amounts of 0.1 to 60% by weight, preferably 1 to 50%, more preferably 2 to 40% by weight. Similarly, antioxidants do not catalytically decompose the peracid, and may be present in the coating in amounts of 0.1 to 20 percent by weight, generally 0.5 to 15, more usually 0.75 to 10 weight percent. Variation of the concentration of active agents to facilitate solubility will be apparent to those skilled in the art. A discussion of the interaction of transition metals and oxidant species may be found in M. W. Lister, *Canadian Journal of Chemistry*, 34:479 (1956), and K. Hagakawa et al., *Bulletin of the Chemical Society of Japan*, 47:1162.

The amount of protective active agents which are required to protect the enzyme will depend in part upon the nature of oxidant bleach, upon the temperature and relative humidity of the environment, and the expected length of time for storage. Additionally, the amount of protective active agent which is required in the coating will vary with the type of protective agent or combination of protective agents used.

Basic materials such as alkali metal silicates may be present in amounts as little as 5% by weight, may constitute a majority of the coating, or may be used as the sole coating.

Reducing agents may be present in the coating material from 0.1 to 60 percent by weight, generally 1 to 50, more usually 2 to 40 weight percent. Antioxidants may be present in the coating material from 0.1 to 20 percent by weight, generally 0.5 to 15, more usually 0.75 to 10 weight percent. Transition metals may be present in the coating material at a concentration of 1 to 2,000 parts per million, generally 2 to 1,000 ppm, more usually 50 to 500 ppm.

Especially preferred is a coating of sodium silicate with or without sodium carbonate in which transition metals are present at a concentration of 50 to 500 parts per million.

Figure 3:
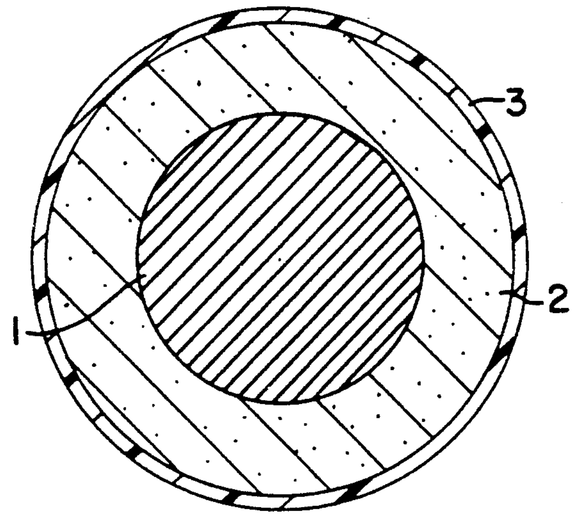
FIG. 3 is a cross-sectional diagram of an enzyme granule or prill which includes a core carrier material, an enzyme layer, and a de-dusting film.

Enzymes may be coated in any physical form. Enzyme prills, which are commonly provided commercially, provide a particularly convenient form for coating, as they may be fluidized and coated in a fluid-bed spray coater. FIG. 1 is a scanning electron micrograph cross-section of an enzyme prill. FIG. 3 shows another form in which enzymes are commercially available, including a core carrier material, 1, the enzyme layer, 2, and a film layer, 3, which acts to minimize dusting characteristics of the enzyme. Coating in a fluid-bed spray coater provides good coating of the granule while allowing economical use of the reactive agents. Enzymes, in prill form of other forms, may be coated, for example, by mixing, spraying, dipping, or blotting. Other forms of coating may be appropriate for other enzyme forms, and will be readily apparent to those skilled in the art. Where necessary a wetting agent or binder such as Neodol® 25-12 or 45-7 may be used to prepare the enzyme surface for the coating material.

Figure 2:
FIG. 2 is a scanning electron micrograph showing a cross sectional view of Alcalase® 2.OT which has been coated with sodium silicate having a modulus (ratio $SiO_2$:$Na_2O$) of 2.00, to a weight gain of 25.5%.

FIG. 2 is a scanning electron micrograph which shows an enzyme prill, 2, which has been coated with PQ brand "D" sodium silicate. The coating, 4, comprises approximately 25.5% by weight of the uncoated granule. The enzyme granule of FIG. 2 was coated using an Aeromatic® fluid bed, Model STREA-1, using a flow rate of 5 g/min, a fluidizing air rate of 130 $m^3/h$, an atomizing air pressure of 1.3 bar, and a bed temperature of 55% C. The coating which was atomized consisted of 15% sodium silicate and 85% water. The average coating thickness is approximately 14 microns.

Figure 4:
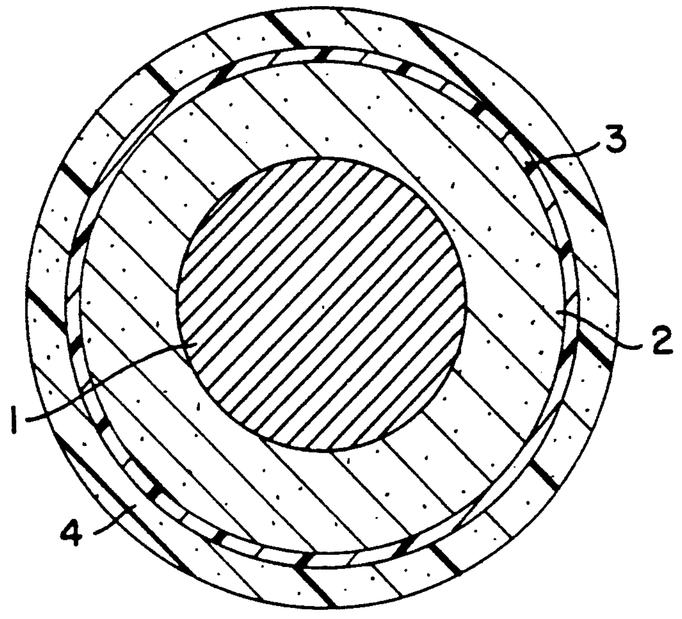
FIG. 4 is a cross-sectional diagram of an enzyme granule such as that shown in FIG. 3 which has been coated with a protective coating according to the subject invention.

FIG. 4 is a diagrammatic cross-section demonstrating an enzyme such as shown in FIG. 3 which has been coated with a soluble protective coating, 4, according to the subject invention.

The thickness of the coating will, to some degree, depend upon the procedure used to apply the coating. When enzyme prills were coated with a "D" sodium silicate solution to a 15% weight gain, the coating averaged approximately 10 microns in thickness. When the same enzyme prills were coated with the same coating to a weight gain of 25%, the coating averaged approximately 14 microns in thickness. Generally, the coating will comprise about 3 to 500% or more by weight of the uncoated enzyme, preferably 5 to 100%, more preferably 10 to 40%, most preferably 15 to 30% by weight. It is obvious that increased coating thickness will decrease enzyme solubility for any given coating. It is therefore desirable to provide a coating which substantially completely coats or encapsulates the granule, which is uniform and durable, easy to apply, causes little or no agglomeration of the coated granules, and which yields adequate solubility in aqueous media, while suitably protecting the activity of the enzyme.

Suitable protection of the enzyme herein refers to the percentage of active enzyme remaining after it has been in intimate contact with an oxidant bleach within a closed environment. As high heat and high relative humidity increase enzyme denaturation, enzyme stability is conveniently measured at 90° F. and 85% relative humidity. Suitable stability is provided by a coating when the stability of a coated enzyme is at least two times, preferably four times, and more preferably after four or more weeks. Experimental conditions involve an admixture of enzyme with a peroxyacid bleach formulation having at least 20% by weight DPDDA granules which are comprised of 20% DPDDA, 9% $MgSO_4$, 10% adipic acid, and 1% binding agent, the remainder being $Na_2SO_4$ and water.

The coated enzyme granules must provide sufficient solubility in detergent solution that enzymes are readily released under wash conditions. A standard detergent solution may be made by dissolving 1.5 grams of Tide® (Procter and Gamble) detergent in one liter of water at 20° C. In general, 90% of the discrete enzyme-containing coated granules should dissolve, disperse or disintegrate in detergent solution at about 20° C. within about 15 min., preferably within about 12 min., and more preferably within about 8 min.

The coated enzymes find use in oxidant bleach compositions. Typical formulations for such bleach compositions are as follows:

| Component | Wt. % |
|---|---|
| EXAMPLE A | |
| Peracid Granules | 1-80 |
| pH Control Particles (boric acid) | 1-5 |
| Coated Enzyme Granules (by weight of uncoated enzyme) | 0.1-10 |
| FWA particles | 0.5-10 |
| Fragrance beads | 0.1-2 |
| Bulking Agent ($Na_2SO_4$) | remainder |
| EXAMPLE B | |
| Peracid Granules | 10-50 |
| pH Control Particles (boric acid) | 10-40 |
| Coated Enzyme Granules (by weight of uncoated enzyme) | 0.5-4 |
| FWA particles | 0.5-5 |
| Fragrance beads | 0.1-1 |
| Bulking Agent ($Na_2SO_4$) | remainder |
| EXAMPLE C | |
| DPDDA | 5-15 |
| Boric Acid | 7-20 |
| FWA | 0.1-1 |
| Coated Enzyme Granules (by weight of uncoated enzyme) | 0.3-2 |
| $NA_2SO_4$ | remainder |

The above formulations are only illustrative. Other formulations are contemplated, so long as they fall within the guidelines for the oxidant bleach/coated enzyme compositions of the invention. The weight percent of the coated enzyme granules in the formula will vary significantly with the weight of the coating. It is intended that the amount of enzyme in the formula fall generally within the range of 0.1 to 10% by weight of the uncoated enzyme.

A preferred embodiment provides a bleach composition in which a peracid bleach is found in stabilized granules in which the water content is carefully controlled, according to U.S. application Ser. No. 899,461 now U.S. Pat. No. 5,089,167. The peracid granules and the discrete enzyme granules are each dry-mixed with the other components to yield a dry bleach composition containing coated enzyme granules.

EXPERIMENTAL

The alkali metal silicate coating provides a soluble shell substantially enclosing the enzyme, which protects the enzyme from the oxidant bleach. The use of additional protective active agents in this coating may increase or decrease the stability or solubility of the coated enzyme. Similarly, the presence of protective agents in a carrier may vary the solubility of the enzyme granule, but will increase the stability of the enzyme as compared to the carrier alone. The table which follows demonstrates the stability and solubility of various silicates, carriers, and reactive additives.

TABLE 1

COATED ENZYME STABILITIES AND SOLUBILITIES

| | Stability (% Enzyme Remaining at 90° F./85% RH | | | Solubility (Time to dissolve in minutes) | |
|---|---|---|---|---|---|
| Coatings | 2 wks | 3 wks | 4 wks | 50% | 90% |
| 1. Uncoated[1] | 7.4 | 9.4 | 4.2 | 1 | 3 |
| 2. "N"[2]/metals[3] | 78.2 | 49.5 | 23.6 | NM[4] | NM[4] |
| 3. "N"[2]/$Na_2SO_3$ | 65.3 | 48.8 | 7.6 | 1.5 | 3 |
| 4. "D"[5] | 95.4 | 73.8 | 73.8 | 2 | 4.5 |
| 5. "D"[5]/metals[3] | 75.5 | 88.3 | 87.4 | 2.5 | 5 |
| 6. "D"[5]/$Na_2CO_3$ | 87.5 | 69.9 | 65.6 | 1.5 | 3.5 |
| 7. "D"/$Na_2SO_3$ | 92.5 | 91.3 | 68.4 | 2 | 3 |
| 8. PVA[6] | 73.3 | 18.2 | 3.6 | 1 | 2 |
| 9. PVA[6]/BHT[7] | 74.4 | 83.7 | 32.1 | NM[4] | NM[4] |

Other Test Conditions: Alcalase ® enzyme tested as admixture of enzyme with peroxyacid bleach formulation containing 20% DPDDA granules. The mixture was stored in sealed 4 oz. cartons.

[1]Uncoated enzyme, average of three runs
[2]Sodium silicate, modulus = 3.22, i.e., PQ brand "N" sodium silicate;
[3]Transition metals
[4]Not measured
[5]Sodium silicate, modulus = 2, i.e. PQ brand "D" sodium silicate
[6]Polyvinyl alcohol
[7]Butylated hydroxytoluene Solubility was determined in each case in a standard detergent solution of one liter of water to which 1.5 grams of Tide ® detergent (Procter and Gamble) has been added. 20 ppm of enzyme in solution was tested. The weight of the uncoated enzyme was adjusted according to the weight gain of the coating. Stirring was continued while aliquots were removed. Three mL aliquots were removed from solution at 15 second intervals for the first minute, and thereafter at 1.5, 2, 2.5, 3, 3.5, 4, 4.5, 5, 6, 8, 10, 12, 15, 20, 25 and 30 minutes. An uncoated control was run with each set of coated samples to ensure consistency of values.

Stability was analyzed as follows: a one-liter volumetric flask was filled two-thirds full with 0.05M borate buffer. Four mL 1.5M $Na_2SO_3$ was added to quench DPDDA. If foaming occured, additional quencher was added 1 ml. at a time, as necessary. Ten grams of sample was added, rinsing the sides with borate buffer, stirring for 10 minutes. The mixture was then diluted to 1L with borate buffer and stirring was continued for 5 minutes. Eight mL of the solution was pipetted into a vial and 8 mL additional buffer was added. This yields 0.075 g Alcalase ® per liter of buffer. Three mL of the diluted solution was pipetted into a Scientific Auto-Analyzer for each sample analyzed.

Unless otherwise noted, stability of the sample was determined after the coated enzyme was admixed with a peroxyacid bleach composition containing 20% DPDDA granules. The mixture was then stored in sealed 4 oz. Double Poly Coated cartons.

Enzyme granules were coated using an Aeromatic ® fluid bed, Model STREA-1, using a flow rate of 5 g/min, a fluidizing air rate of 130 $m^3/h$, an atomizing air pressure of 1.3 bar, and a bed temperature of 55° C.

"D" and "N" sodium silicates refer to "D" and "N" sodium silicate, from PQ Corp.

EXAMPLE 1

Enzymes and a diperoxyacid detergent bleach composition were each placed within a closed container, but not in physical contact with each other.

A 0.14 grams Alcalase ® 2.OT sample was placed in an open 20 mL vial. The vial was then placed within an 8-oz jar which contained a diperoxyacid bleach composition according to Example "C", above. The 8-oz jar was then sealed, and stored at 100° F. for four weeks. The enzyme activity after four weeks was 53% that of the original level. A control sample of Alcalase ® 2.OT stored at 100° F. for four weeks in a closed vial demonstrated enzyme activity of 97% of the original level.

This demonstrates that mere physical separation was not sufficient to protect the enzyme from the effects of close proximity to the diperoxyacid bleach composition. Thus, active agents to protect the enzyme are required to achieve acceptable stability.

EXAMPLE 2

Shellac was used to coat a hydrolase enzyme. Two hundred grams of Alcalase ® 2.OT was introduced into a fluid-bed spray coater and fluidized therein, by means of a stream of warm (50°-55° C.) air at approximately 100 $m^3/h$. A solution of shellac was diluted to 18% solids with ethanol, and was sprayed onto the fluidized enzyme through a nozzle, at a rate of 6 to 10 g/min. The temperature prevailing in the turbulent air mixer was about 45° C. The readily flowable granulated enzyme composition was then coated. The coated enzymes were characterized as follows: The coating comprised 22% by weight of the uncoated enzyme. The granules demonstrated 50% solubility in detergent solution by 20 minutes at 20° C., and 90% solubility by 27 minutes. The stability of the coated enzyme is a diperoxyacid bleach composition was 46% of enzyme remaining at 90° F./85% relative humidity after two week storage. The stability of the uncoated enzyme under the same conditions was 7.4%. This demonstrates that acceptable stability can be achieved but that unless the coating is carefully selected, unacceptable solubility results.

EXAMPLE 3

Polyethylene glycol was used to coat a hydrolase enzyme. Two hundred grams of Alcalase ® 2.OT was introduced into a fluid-bed spray coater and fluidized therein, by means of a stream of warm (50°-55° C.) air at approximately 130 $m^3/h$. A solution of 20% PEG 4600 Carbowax ® (Union Carbide), 30% water, and 50% ethanol was sprayed onto the fluidized enzyme through a nozzle, at a rate of 3 g/min. The temperature prevailing in the turbulent air mixer was about 45° C. The readily flowable granulated enzyme composition was then coated. The coated enzymes were characterized as follows: The coating comprised 20.6% by weight of the uncoated enzyme. The granules demonstrated 50% solubility in detergent solution by 0.75 minutes at 20° C., and 90% solubility by 1.5 minutes. The stability of the coated enzyme in a diperoxyacid bleach composition was 13.8% of enzyme remaining at 90° F./85% relative humidity after two week storage. The stability of the uncoated enzyme under the same conditions was 7.4%.

This demonstrates that mere physical separation is not sufficient to protect the enzyme from oxidant species. A chemical barrier which both acts to neutralize the oxidant species and which provides suitable solubility for the detergent bleach is required.

EXAMPLE 4

Four parts (by weight) of Alcalase 2.OT was added in a beaker to one part Neodol® 45-7 (Shell) at 100° F. Sodium carbonate was added one part at a time with vigorous stirring to a total of eight parts of sodium carbonate. The percent weight gain was approximately 225% based upon the weight of the enzyme. After 4 weeks at 100° F. in a dry bleach formula containing approximately 20% peracid granules the stability of the coated enzyme was 83%, compared to 67% for the uncoated enzyme under the same conditions.

EXAMPLE 5

Sodium silicate having a modulus of 2.00 was used to coat a hydrolase enzyme.

Two hundred g of Alcalase® 2.OT was introduced into a fluid-bed bed spray coater and fluidized therein, by means of a stream of warm (50°-55° C.) air at approximately 130 $m^3/h$. "D" sodium silicate solution, diluted with water from 44% solids to 25% solids, was sprayed onto the fluidized enzyme through a nozzle, at a rate of 7 g/min. The temperature prevailing in the turbulent air mixer was about 50° C. The readily flowable granulated enzyme composition was then coated. The coated enzymes were characterized as follows: The coating comprised 22.5% by weight of the uncoated enzyme. The granules demonstrated 50% solubility in detergent solution by 2 minutes at 20° C., and 90% solubility by 4.5 minutes. The stability of the coated enzyme in a diperoxyacid bleach composition was 74% of enzyme remaining at 90° F./85% relative humidity after four week storage. The stability of the uncoated enzyme under the same conditions was 4%.

EXAMPLE 6

Transition metals were added to the sodium silicate of Example 5.

200 g of Alcalase® 2.OT was introduced into a fluid-bed spray coater and fluidized therein, by means of a stream of warm (50°-55° C.) air at approximately 130 $m^3/h$. "D" sodium silicate solution containing 100 ppm each of copper as copper sulfate, iron as iron sulfate, cobalt as cobalt sulfate, and nickel as nickel sulfate, was sprayed onto the fluidized enzyme through a nozzle, at a rate of 6 g/min. The temperature prevailing in the turbulent air mixer was about 50° C. The readily flowable granulated enzyme composition was then coated. The coated enzymes were characterized as follows: The coating comprised 22% by weight of the uncoated enzyme. The granules demonstrated 50% solubility in detergent solution by 2.5 minutes at 20° C., and 90% solubility by 5.0 minutes. The stability of the coated enzyme in a diperoxyacid bleach composition was 87% of enzyme remaining at 90° F./85% relative humidity after four week storage. The stability of the uncoated enzyme under the same conditions was 4%.

EXAMPLE 7

Sodium carbonate was added to the sodium silicate of Example 5.

200 g of Alcalase® 2.OT was introduced into a fluid-bed spray coater and fluidized therein, by means of a stream of warm (50°-55° C.) air at approximately 130 $m^3/h$. A solution was 15% "D" sodium silicate solids, 10% $Na_2CO_3$, and 75% water was sprayed onto the fluidized enzyme through a nozzle, at a rate of 6 g/min. The temperature prevailing in the turbulent air mixer was about 50° C. The readily flowable granulated enzyme composition was then coated. The coated enzymes were characterized as follows: The coating comprised 20.5% by weight of the uncoated enzyme. The granules demonstrated 50% solubility in detergent solution by 1.5 minutes at 20° C., and 90% solubility by 3.5 minutes. The stability of the coated enzyme in a diperoxyacid bleach composition was 66% of enzyme remaining at 90° F./85% relative humidity after four week storage. The stability of the uncoated enzyme under the same conditions was 4% remaining.

EXAMPLE 8

Sodium sulfite (a reducing agent) was added to the sodium silicate of Example 5.

200 g. of Alcalase® 2.OT was introduced into a fluid-bed spray coater and fluidized therein, by means of a stream of warm (50°-55° C.) air at approximately 130 $m^3/h$. Sodium sulfite was dissolved in water. It was then added to "D" sodium silicate to make a solution containing 12.6% "D" sodium silicate solids, 8.4% sodium sulfite, and 79% water. The solution was sprayed onto the fluidized enzyme through a nozzle, at a rate of 7 g/min. The temperature prevailing in the turbulent air mixer was about 50° C. The readily flowable granulated enzyme composition was then coated. The coated enzymes were characterized as follows: The coating comprised 17% by weight of the uncoated enzyme. The coating was targeted to contain 60% "D" sodium silicate and 40% sodium sulfite. The granules demonstrated 50% solubility in detergent solution by 2 minutes at 20° C., and 90% by 3 minutes. The stability of the coated enzyme in a diperoxyacid bleach composition was 68% of enzyme remaining at 90° F./85% relative humidity after four week storage. The stability of the uncoated enzyme under the same conditions was 4%.

EXAMPLE 9

Sodium silicate having a modulus of 3.22 was used to coat a hydrolase enzyme. Solubility was significantly decreased as compared to sodium silicate having a modulus of 2.0.

200 g. of Alcalase® 2.OT was introduced into a fluid-bed spray coater and fluidized therein, by means of a stream of warm (45°-50° C.) air at approximately 130 $m^3/h$. "N" sodium silicate was diluted from 44% solids (as recited) to 25% solids, with water. The solution was sprayed onto the fluidized enzyme through a nozzle, at a rate of 5 g/min. The temperature prevailing in the turbulent air mixer was about 45° C. The readily flowable granulated enzyme composition was then coated. The coated enzymes were characterized as follows: The coating comprised 35% by weight of the uncoated enzyme. The granules demonstrated 50% solubility in detergent solution by 11.5 minutes at 20° C., and 90% solubility by 20 minutes. The stability of the coated enzyme in a diperoxyacid bleach composition was 64% of enzyme remaining at 90° F./85% relative humidity after four week storage. The stability of the uncoated enzyme under the same conditions was 4%.

EXAMPLE 10

Polyvinyl alcohol was used as a coating for a hydrolase enzyme. Solubility was good, however the stability of the enzyme was not acceptable after four weeks storage. Sodium lauryl sulfate was added to reduce tackiness.

200 g. of Alcalase® 2.OT was introduced into a fluid-bed spray coater and fluidized therein, by means of a stream of warm (40° C.) air at approximately 130 $m^3/h$. A solution of 4.9% polyvinyl alcohol, 6.1% sodium lauryl sulfate, 44.5% water, and 44.5% ethanol was sprayed onto the fluidized enzyme through a nozzle, at a rate of 3 g/min. The temperature prevailing in the turbulent air mixer was about 35°-40° C. The readily flowable granulated enzyme composition was then coated. The coated enzymes were characterized as follows: The coating comprised 9% by weight of the uncoated enzyme. The granules demonstrated 50% solubility in detergent solution by 1 minute at 20° C., and 90% solubility by 2 minutes. The stability of the coated enzyme in a diperoxyacid bleach composition showed 3.6% of the enzyme remaining after four week storage at 90° F./85% relative humidity. The stability of the uncoated enzyme under the same conditions was 4% remaining.

EXAMPLE 11

When BHT, an antioxidant, was added to the PVA of Example 10, enzyme stability was significantly increased.

200 g. of Alcalase® 2.OT was introduced into a fluid-bed spray coater and fluidized therein, by means of a stream of warm (40° C.) air at approximately 130 $m^3/h$. A solution containing 4.44% polyvinyl alcohol, 5.56% sodium lauryl sulfate, 0.1% BHT, 44.5% water and 44.9% ethanol was sprayed onto the fluidized enzyme through a nozzle, at a rate of 4 g/min. The temperature prevailing in the turbulent air mixer was about 35°-40° C. The readily flowable granulated enzyme composition was then coated. The coated enzymes were characterized as follows: The coating comprised 10.5% by weight of the uncoated enzyme. The coating was targeted to comprise 44% PVA, 55% sodium lauryl sulfate, and 1% BHT. The stability of the coated enzyme in a diperoxyacid bleach composition was 32% of enzyme remaining at 90° F./85% relative humidity after four week storage. The stability of the uncoated enzyme under the same conditions was 4% remaining.

EXAMPLE 12

Figure 5:
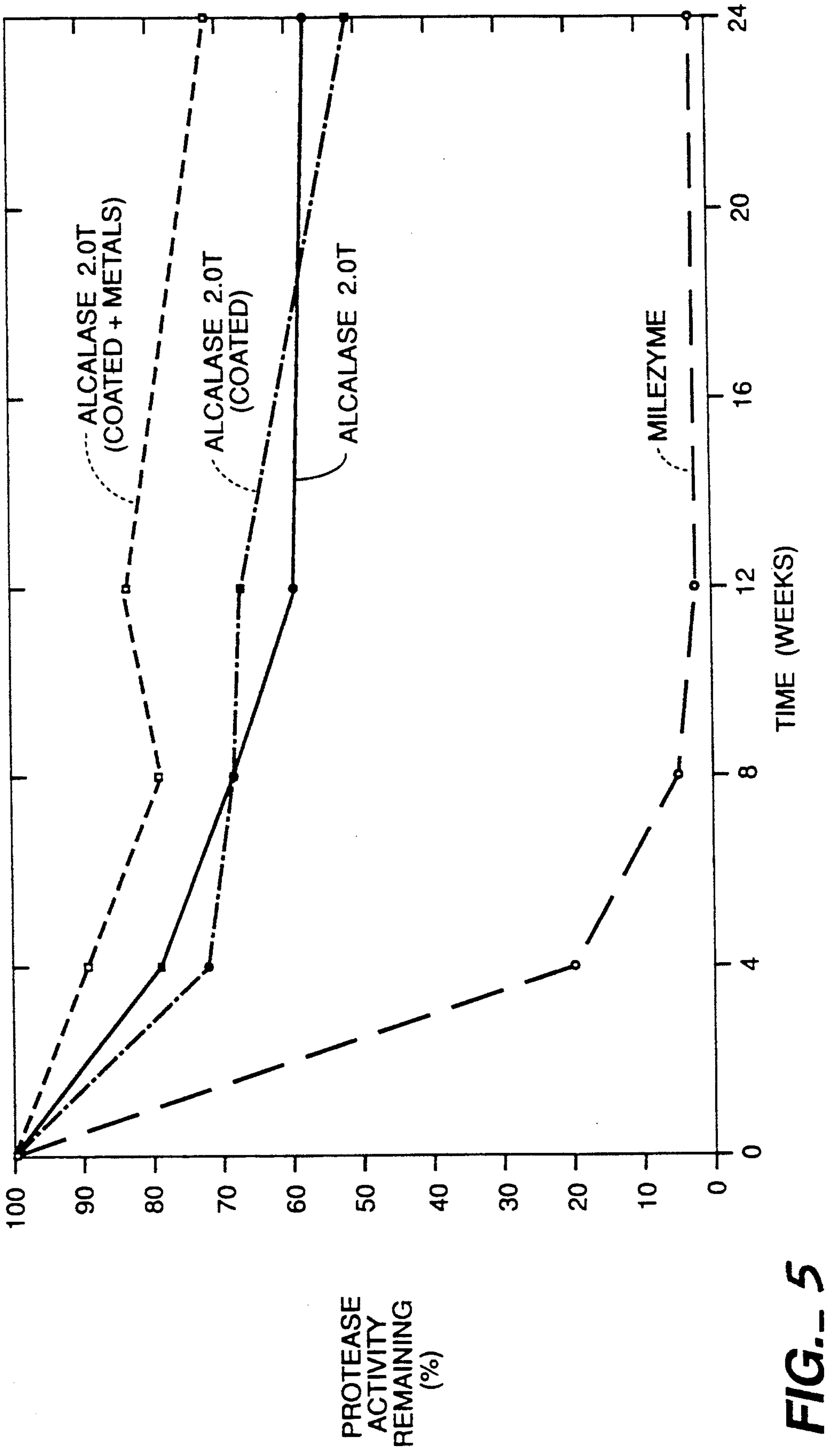
FIG. 5 is a graphical depiction of comparative enzyme stability in an oxidant (sodium percarbonate) formulation.

In a further example, silicate combined with transition metal salts were used to encapsulate enzymes, which were then mixed with a sodium percarbonate-based dry bleach composition. As in Examples 5-6 above, 200 g Alcalase® 2.OT was introduced into a fluid bed spray coater and fluidized by using a stream of warm air (50°-55° C.) at a flow rate of about 130 $m^3/h$. "D" silicate solution containing 100 ppm each of copper as $CuSO_4$, iron as $FeSO_4$, cobalt as $CoSO_4$, and nickel as $NiSO_4$, was sprayed onto the fluidized enzyme through a nozzle, at a rate of 6 g/min. The fluid enzyme mixture was then coated. As in Example 6, the coating comprised 22% by weight of the uncoated enzyme. The stability of the enzyme in a percarbonate based dry bleach was 89% enzyme remaining under 90° F./85% relative humidity after four weeks storage. The percarbonate formulation comprised 54.6% $Na_2CO_3$, 43.96% percarbonate, 0.68% Tinopal 5BMX-C (fluorescent whitening agent, Ciba-Geigy), 0.48% fragrance, and 0.28% Triton X-100 (nonionic surfactant, dedusting agent). The stability of a coated enzyme, without transition metals, had good but lesser stability, about 79%, for the same time period. Uncoated Alcalase had 72% stability for the same time. Uncoated Milezyme® had poor stability (19%) for the same time. For long term stability, the Alcalase® coated with both silicate and transition metals had good stability under the same temperature/relative humidity for 24 weeks: about 73%. Alcalase coated with silicate only, and uncoated Alcalase, had, respectively, 52% and 58% of activity remaining for the same 24 week period. Milezyme® stability remained low at about 2%. This is graphically depicted in FIG. 5.

Although the above description and the claims appended hereto describe methods and compositions useful as household bleaches, variations and modifications thereof which are within the spirit and scope of this application, are also included.

We claim:

1. A dry, granular oxidant bleach and enzyme composition which has enhanced enzyme stability despite prolonged storage in the presence of said oxidant bleach, and improved enzyme solubility in an aqueous medium, said bleach composition comprising:

a) an oxidant selected from the group consisting of alkali metal perborates, alkali metal percarbonates, hydrogen peroxide adducts, and mixtures thereof; and b) a hydrolase which is coated substantially completely by a water soluble polymer in the range of 10-40% by weight of the uncoated hydrolase, in which an additive selected from the group consisting of reducing agents, a transition metal, and mixtures thereof is incorporated in an effective amount to enhance hydrolase stability.

2. The oxidant bleach and enzyme composition of claim 1 wherein said oxidant is an alkali metal perborate.

3. The oxidant bleach and enzyme composition of claim 1 wherein said hydrolase is a protease.

4. The oxidant bleach and enzyme composition of claim 1 wherein said additive is a reducing agent.

5. The oxidant bleach and enzyme composition of claim 4 wherein said reducing agent is sodium sulfite or sodium thiosulfate.

6. The oxidant bleach and enzyme composition of claim 1 wherein said additive is a transition metal.

7. The oxidant bleach and enzyme composition of claim 6 wherein said transition metal is selected from the group consisting of iron, cobalt, nickel, copper salts and mixtures thereof.

* * * * *